United States Patent [19]

Ohnishi et al.

[11] Patent Number: 4,748,361
[45] Date of Patent: May 31, 1988

[54] PERMANENT MAGNET ELECTRIC MOTOR

[75] Inventors: Kouhei Ohnishi, Yokohama; Akira Mochizuki, Yono, both of Japan

[73] Assignee: Mitsubishi Kinzoku Kabushiki Kaisha, Tokyo, Japan

[21] Appl. No.: 937,713

[22] Filed: Dec. 4, 1986

[30] Foreign Application Priority Data

Dec. 5, 1985 [JP] Japan .................. 60-274241

[51] Int. Cl.$^4$ .................................. H02K 19/26
[52] U.S. Cl. .................................. 310/156; 310/89
[58] Field of Search ................ 310/89, 156, 154, 261, 310/262, 268, 254, 256, 257, 178; 417/423 G

[56] References Cited

U.S. PATENT DOCUMENTS

| 3,208,269 | 9/1965 | Eccles et al. | 310/156 X |
| 3,407,320 | 11/1965 | McLean | 310/87 |
| 3,549,924 | 12/1970 | Klein | 310/156 X |
| 3,906,267 | 9/1975 | Coupin et al. | 310/156 X |
| 4,127,802 | 11/1978 | Johnson | 310/156 X |
| 4,187,441 | 2/1980 | Oney | 310/156 X |
| 4,306,164 | 12/1981 | Itoh et al. | 310/156 X |
| 4,371,801 | 2/1983 | Richter | 310/254 X |

FOREIGN PATENT DOCUMENTS

| A2460062 | 12/1974 | Denmark . |
| A0162927 | 11/1984 | European Pat. Off. . |
| A2266970 | 4/1975 | France . |
| 6066658 | 9/1983 | Japan . |
| 60102856 | 11/1983 | Japan . |
| A2139821 | 4/1984 | United Kingdom . |

OTHER PUBLICATIONS

European Patent Office Search Report (EP 86 11 6915) 9/2/87.

Primary Examiner—Mark O. Budd
Attorney, Agent, or Firm—Scully, Scott, Murphy & Presser

[57] ABSTRACT

An electric motor includes a housing, a rotor and a stator. The rotor includes a rotor shaft rotatably supported on the housing. The rotor includes a plurality of disk portions disposed on the rotor shaft coaxially therewith and spaced from each other axially of the rotor shaft. Each of the disk portions has a thickness gradually decreasing radially outwardly thereof. The stator includes a plurality of annular portions disposed on the housing coaxially with the rotor shaft and spaced from each other axially of the rotor shaft. Each of the annular portions has a thickness gradually decreasing radially inwardly thereof. The annular portions and the disk portions are loosely fitted with each other with a gap formed therebetween. Opposed side surfaces of the annular portion and disk portion are conical. Each of the annular portions has a coil disposed in each conical side surface thereof. Each of the disk portions has permanent magnets disposed at least in each conical side surface thereof.

6 Claims, 2 Drawing Sheets

PERMANENT MAGNET ELECTRIC MOTOR

BACKGROUND OF THE INVENTION

1. Field of the Invention

The present invention relates to a high-output electric motor which is small and lightweight, and is suitably employed as a servomotor for a robot, a machine tool, an office automation apparatus and the like.

2. Prior Art

One conventional electric motor includes a cylindrical rotor rotatably received in and supported on a housing and a stator disposed in and fixedly secured to the housing to encompass the rotor. For obtaining a high-output electric motor of such construction, it is necessary to increase the outer diameter of the rotor or to lengthen the rotor axially thereof, so as to increase the surface area of the rotor. In that case, however, the weight and moment of inertia of the rotor are increased unduly, so that the motor becomes unsuitable for driving a small apparatus.

To overcome the above problems, a motor which is lightweight and has low moment of inertia and high torque has been proposed, for example, in Japanese patent application Laid-Open No. 60-66658. The motor includes rotor disks each having a plurality of permanent magnets disposed in a radial manner and stator rings each having a winding or coil, the rotor disk and the stator ring being disposed alternately in an axial direction so that the magnets of each rotor disk face the coil of each stator disk. The aforementioned motor, however, has a drawback that the heat generated in the inner peripheral portion of each stator disk is not sufficiently dissipated.

SUMMARY OF THE INVENTION

It is therefore an object of the present invention to provide an electric motor which includes a lightweight rotor having low moment of inertia and can achieve high power output, and which permits heat generated in a stator to be easily and sufficiently dissipated.

According to the present invention, there is provided an electric motor comprising a housing, a rotor including a rotor shaft having an axis of rotation therethrough and rotatably supported on the housing and a plurality of disk portions disposed on the rotor shaft coaxially therewith and spaced from each other axially of the rotor shaft, each of the disk portions having a thickness gradually decreasing radially outwardly thereof, and a stator including a plurality of annular portions disposed on the housing coaxially with the rotor shaft and spaced from each other axially of the rotor shaft, each of the annular portions having a thickness gradually decreasing radially inwardly thereof, the annular portions and the disk portions being loosely fitted with each other with a gap formed therebetween, opposed side surfaces of the annular portion and disk portion being conical, each of the annular portions having coil means disposed in each conical side surface thereof, each of the disk portions having permanent magnet means disposed at least in each conical side surface thereof.

DESCRIPTION OF PREFERRED EMBODIMENTS OF THE INVENTION

Figure 1:
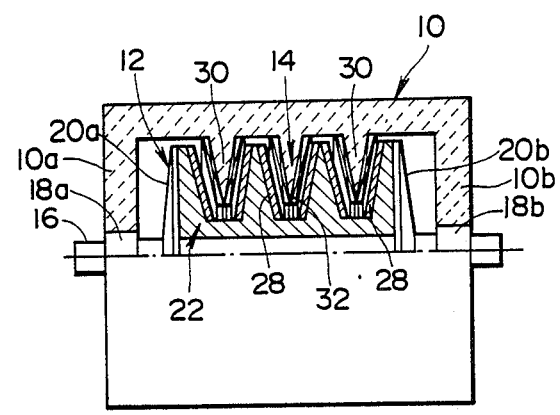
FIG. 1 is a partially cross-sectional view of an electric motor in accordance with the present invention.

The present invention will now be described with reference to the drawings in which like reference numerals denote corresponding parts in several views.

Figure 2:
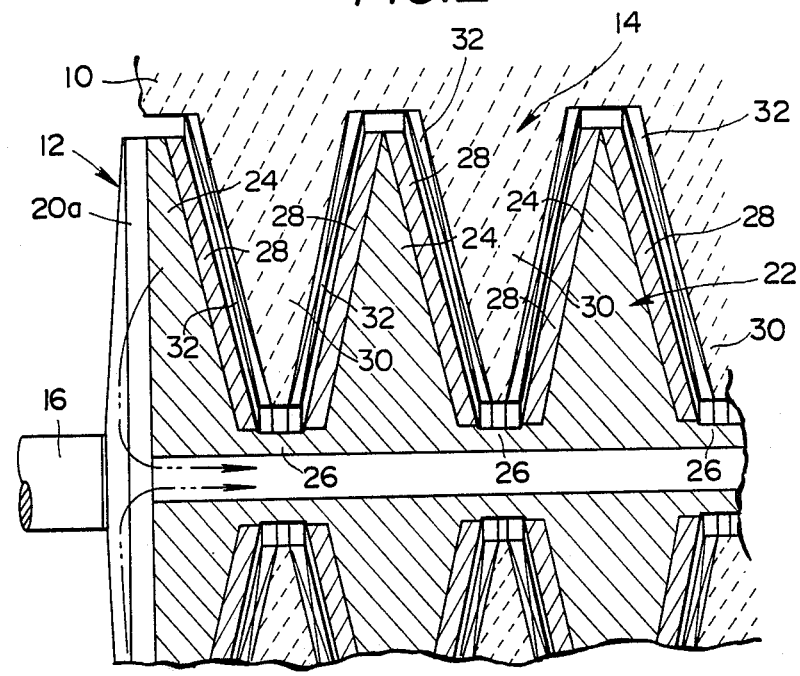
FIG. 2 is an enlarged cross-sectional view of a part of the motor of FIG. 1.

Referring to FIGS. 1 and 2, there is illustrated an electric motor in accordance with one embodiment of the present invention. The motor includes a cylindrical housing 10 of a heat-resistant non-magnetic material such as ceramics having a pair of end wall portions 10a and 10b at opposite ends thereof, a rotor 12 rotatably received in the housing 10 and a stator 14 integrally formed on an inner peripheral surface of the housing 10. The non-magnetic material of the housing 10 may be plastics such as an epoxy resin and a silicone resin. The rotor 12 includes a rotor shaft 16 of a magnetic material such as iron having an axis of rotation therethrough and rotatably supported on the end wall portions 10a and 10b of the housing 10 through a pair of bearing means 18a and 18b such as oilless bearings. The rotor shaft 16 includes a pair of flange portions 20a and 20b integrally formed thereon and spaced from each other axially thereof. The flange portions 20a and 20b are disposed within the housing 10 so that the flange portion 20a is adjacent to the end portion 10a of the housing 10 while the other flange portion 20b is adjacent to the other end wall portion 10b of the housing 10. The rotor 12 also includes a body portion 22 of ceramics or non-magnetic metal mounted on the rotor shaft 16 and disposed between the flange portions 20a and 20b thereof. The body portion 22 includes a plurality of disk portions 24 disposed on the rotor shaft 16 coaxially therewith and equally spaced from each other axially of the rotor shaft 16 and a plurality of reduced-diameter portions 26 each disposed on the rotor shaft 16 and extending between each adjacent pair of the disk portions 24. Each disk portion 24 has an axial thickness decreasing radially outwardly thereof so that the body portion 20 has a sawtooth-like longitudinal cross section. Specifically, the end disk portions 24 disposed adjacent to the pair of the flange portions 20a and 20b respectively, have one beveled or conical side surfaces each directed generally axially thereof and the other flat side surfaces held in abutment with the pair of the flange portions 20a and 20b, respectively. Each disk portion 24 except the end disk portions includes opposite beveled or conical side surfaces each directed generally axially thereof. A plurality of sector permanent magnets 28 are mounted in each side conical surface of the disk portion 24 in a radial manner. Each of the permanent magnets 28 may be neodymium-iron-boron magnet, ferrite magnet, samarium-cobalt magnet or the like. The stator 14 integrally formed on the inner peripheral surface of the housing 10 includes a plurality of annular portions 30 disposed around the rotor shaft 16 coaxially therewith and spaced from each other axially thereof. Each annular portion 30 has an axial thickness gradually decreasing radially inwardly thereof so that the annular portions 30 have a sawtooth-like longitudinal cross section, each annular portion 30 having opposite beveled or conical side surfaces directed generally axially thereof.

The annular portions 30 and the disk portions 24 of the rotor 12 are loosely meshed or fitted with each other with a gap formed therebetween so that the conical side surface of the disk portion 24 faces the conical side surface of the annular portion 30 disposed adjacent thereto. And, a stator winding or coil 32 is embedded in each conical side surface of the annular portion 30 so as to face the permanent magnets 28 in the conical side surface of the disk portion 24 disposed adjacent thereto.

With the construction described above, inasmuch as the body portion 22 of the rotor 12 and the annular portions 30 of the stator 14 have a sawtooth-like longitudinal cross section, respectively, and are disposed so as to be loosely fitted with each other, it is possible to increase the outer diameter of the rotor 12 without increasing the overall size of the motor, and besides the area of the surface of the rotor 12 facing the surface of the stator 14 can be increased. Accordingly, the output torque of the motor can be substantially increased. In addition, since the weight of the rotor 12 can be reduced without reducing the surface area of the rotor 12, the moment of inertia of the rotor 12 can be reduced. Further, since the cross-sectional area of each annular portion 30 of the stator 14 gradually increases radially outwardly thereof, the heat generated in the inner peripheral portion of the stator 14 is efficiently transferred by heat conduction through the stator 14 and the housing 10 to be easily dissipated outside, thereby preventing the heat from being accumulated locally in the inner peripheral portion of the stator 14. Further, in the motor described above, magnetic flux flows in an axial direction toward the one flange portion 20a of the rotor shaft 16, and then passes from the one flange portion 20a through the rotor shaft 16 axially thereof to the other flange portion 20b, so that a closed loop or circuit of magnetic flux is defined within the housing 10. Accordingly, the magnetic flux is definitely prevented from leaking outside through the housing 10, thereby improving the efficiency of the motor.

Figure 3:
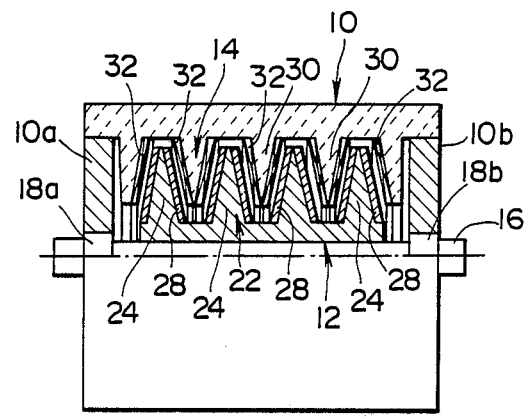
FIG. 3 is a view similar to FIG. 1, but showing a modified electric motor in accordance with the present invention.

FIG. 3 shows a modified electric motor in accordance with the present invention which differs from the aforementioned motor in that the housing 10 includes the end wall portions 10a and 10b provided as separate members and made of a magnetic material to omit the flange portions 20a and 20b of the rotor shaft 16, thereby permitting the magnetic flux to flow through the end wall portions 10a and 10b to and from the rotor shaft 16.

Figure 4:
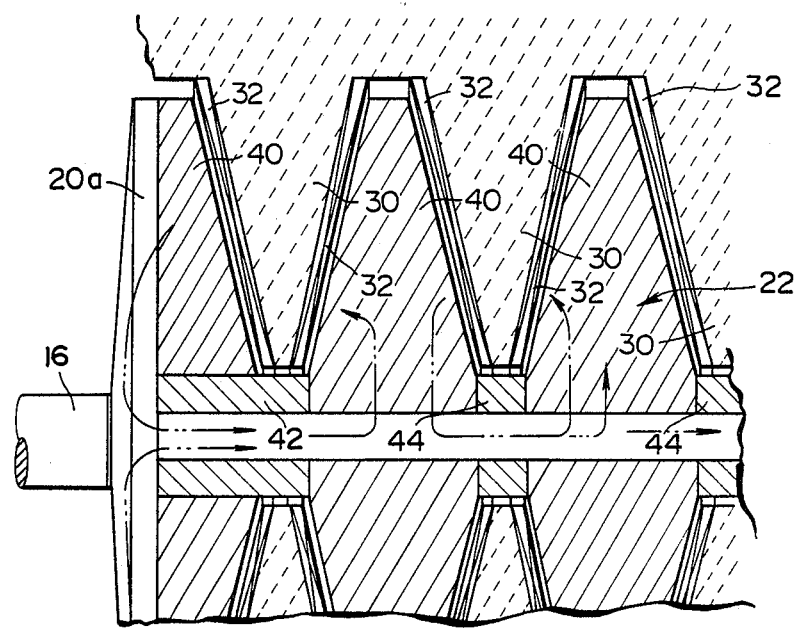
FIG. 4 is a view similar to FIG. 2, but showing another modified electric motor in accordance with the present invention.

FIG. 4 shows another modified electric motor in accordance with the present invention. The rotor 12 of the motor includes the body portion 22 having a plurality of disk-shaped permanent magnets 40 mounted on the rotor shaft 16 in axially equally spaced relation and a pair of tubular sleeves 42 (only one of which is shown) of a non-magnetic material interposed respectively between the roll shaft 16 and the end disk-shaped magnet 40 disposed adjacent to the flange portion 20a and between the roll shaft 16 and the end disk-shaped magnet 40 disposed adjacent to the flange portion 20b and a plurality of annular spacer members 44 of a non-magnetic material each interposed between each adjacent pair of the intermediate disk-shaped magnets 40 except the end disk-shaped magnets, each sleeve 42 having one end face held in abutment with a respective one of the flange portions 20a and 20b and the other end face held in abutment with a respective one of the magnets disposed adjacent to the end magnets. In the motor of this construction, the magnetic flux flows, similarly to the aforementioned motors, from the one flange portion 20a through the rotor shaft 16 axially thereof to the other flange portion. In addition, the magnetic flux flowing into the rotor shaft 16 flows from the rotor shaft 16 directly to each intermediate permanent magnetic 40, and besides the magnet flux flows directly from each intermediate magnet 40 through the rotor shaft 16 to the magnet adjacent thereto.

While the electric motor according to the present invention has been specifically shown and described herein, the invention itself is not to be restricted by the exact showing of the drawings or the description thereof. For example, in the motors of FIGS. 1 to 3, the sector permanent magnets 28 disposed in each side surface of the disk portion 24 may comprise an umbrella-shaped magnet of an integral construction. In addition, the rotor body 22 may be composed of several units each having a plurality of disk portions integrally formed with each other. In the motor shown in FIG. 4, the tubular sleeves 42 may be replaced by the annular spacer members 44.

What is claimed is:

1. An electric motor comprising:
a housing including a cylindrical portion of a non-magnetic material;
a rotor including a rotor shaft of a magnetic material having a longitudinal axis of rotation and being rotatably supported on said housing, and a plurality of disk portions disposed on said rotor shaft coaxially therewith and being spaced from each other axially of said rotor shaft, each of said disk portions having a radially outwardly gradually decreasing thickness;
a stator including a plurality of annular portions of a non-magnetic material disposed on an inner periphery of said cylindrical portion of said housing coaxially with said rotor shaft and being spaced from each othr axially of said rotor shaft, each of said annular portions having a gradually decreasing thickness, said annular portions and said disk portions being loosely fitted with each other to provide a gap therebetween, opposed side surfaces of said annular portion and disk portion being conical, each of said annular portions having coil means disposed in each conical side face thereof, each of said disk portions having permanent magnet means disposed at least in each conical side surface thereof; and
a pair of end members of a magnetic material being spaced from each other axially of said rotor shaft and having said annular portions and said disk portions interposed therebetween, each end member being connected to said rotor shaft to cause a magnetic flux to flow between each other.

2. An electric motor according to claim 1, in which said pair of end members are integrally mounted on said rotor shaft.

3. An electric motor according to claim 1, in which said housing includes said pair of end members disposed at opposite ends of said cylindrical portion, and bearing means of a magnetic material rotatably supporting said rotor shaft on said end members.

4. An electric motor according to claim 1, in which each of said disk portions of said rotor is composed entirely of a permanent magnet, said permanent magnet constituting said permanent magnet means.

5. An electric motor according to claim 4, in which said rotor includes a plurality of annular members of a nonmagnetic material mounted on said rotor shaft disposed between each adjacent pair of said disk portions.

6. An electric motor according to claim 5, in which said rotor shaft includes a pair of integral flange portions spaced from each other axially thereof so as to interpose said disk portions therebetween.

* * * * *